April 17, 1951        E. MARTIN        2,549,108
PROPELLER PITCH CONTROL
Filed Dec. 29, 1943        2 Sheets-Sheet 1
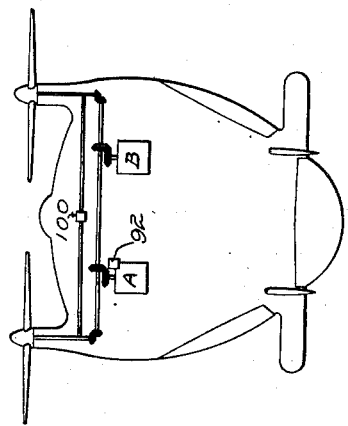
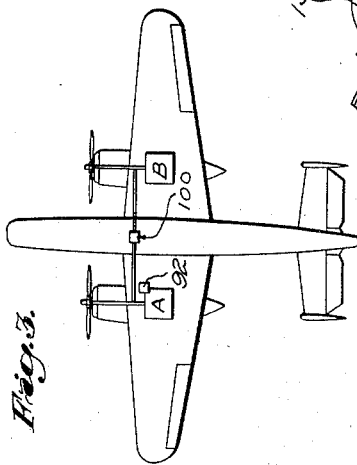
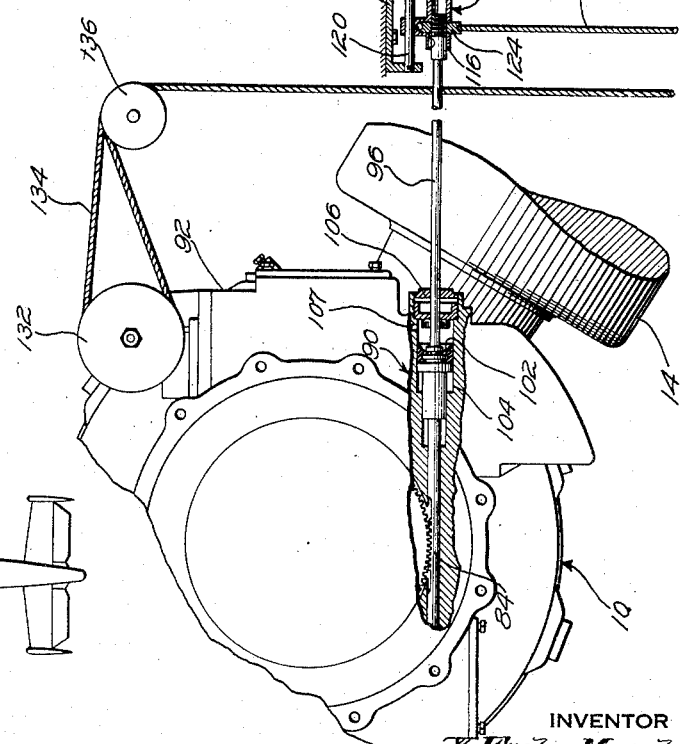
INVENTOR
*Erle Martin*
BY *Harris G. Luther*
*Attorney*

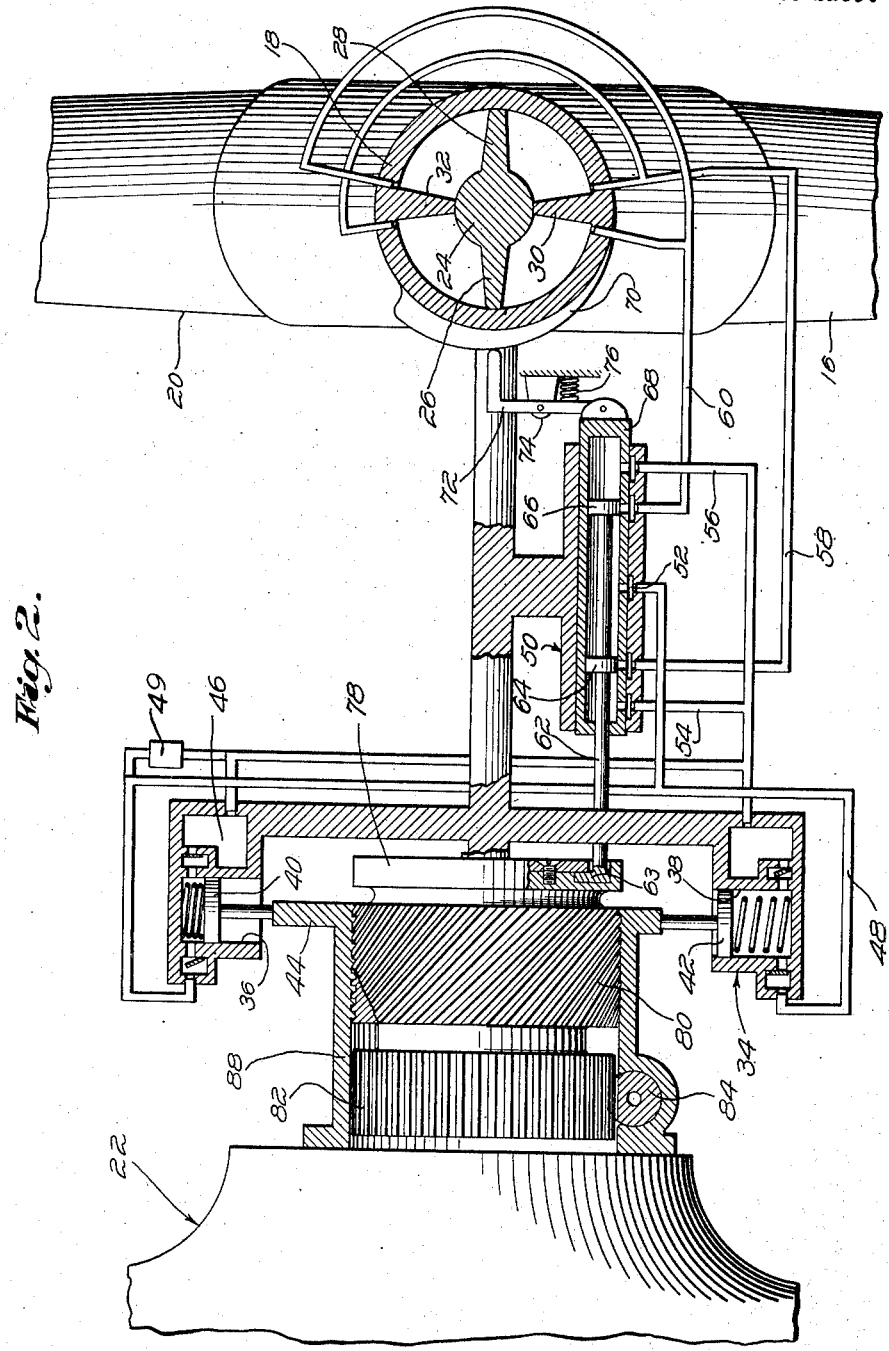

Patented Apr. 17, 1951

2,549,108

UNITED STATES PATENT OFFICE 2,549,108

PROPELLER PITCH CONTROL

Erle Martin, West Hartford, Conn., assignor to United Aircraft Corporation, East Hartford, Conn., a corporation of Delaware Application December 29, 1943, Serial No. 516,042

14 Claims. (Cl. 170—135.24)

This application is a continuation-in-part of U. S. application Serial No. 460,495, filed October 2, 1942, by Erle Martin, now abandoned.

This invention relates to improvements in speed control apparatus for aircraft power plants with particular reference to a power plant which includes two engines and two controllable-pitch propellers.

An object of the invention resides in the provision of a control apparatus of the character indicated which uses only a single governor driven by one of the engines.

A further object resides in the provision of a power plant speed control apparatus which is operative to maintain both engines at a speed determined by the setting of the governor by controlling the pitch of the engine driven propellers.

A further object resides in the provision of means to proportion the total thrust between two mechanically connected propellers.

A still further object resides in the provision of a speed control apparatus of the character indicated which includes manually adjustable means for varying the speed or thrust of one propeller with respect to the speed or thrust of the other in order that slight variations in the speed or thrust may be corrected, or the two propellers may be caused to operate at slightly different speeds or with slightly different thrusts if such a method of operation should be desired, as, for instance, in order to control the direction of the aircraft.

An additional object resides in the provision of speed controlling apparatus of simplified construction, involving economy of parts with consequent reduction in weight and in the possibility of mechanical failure.

Other objects and advantages will be more particularly pointed out hereinafter or will become apparent as the description proceeds.

In the accompany drawings, in which like reference numerals are used to designate similar parts throughout, there is illustrated a suitable mechanical embodiment for the purpose of disclosing the invention.

In the drawings, Fig. 1 is a somewhat diagrammatic rear elevational view of the propeller hub portions of two engines, showing the application thereto of apparatus constructed according to the invention.

Fig. 2 is a diagrammatic illustration of a portion of the speed control apparatus of one of the engines.

Fig. 3 is a schematic view showing independent power units, and

Fig. 4 is a schematic view showing engines and propeller geared together.

Referring to the drawings in detail, the numeral 10 generally designates the hub portion of one propeller and 12 designates the hub portion of a second propeller, the two propellers with their engines constituting the main component of the power plant. The two propellers may be geared together to rotate in opposite directions, and therefore having opposite pitches, with each engine A and B supplying power to both propellers through the interconnecting gear train as shown in the Zimmerman Pat. No. 2,431,293, issued November 18, 1947 and as schematically shown in Fig. 4 of this application or each propeller may be separately driven by its respective engine so that each engine-propeller unit is an independent unit as shown in Fig. 3. Each propeller hub carries a plurality of blades rotatably mounted for pitch changing movements, one of the blades for the hub 10 being indicated at 14 and one of the blades for hub 12 being indicated at 16.

The manner in which the blades are moved for pitch adjustment is diagrammatically illustrated in Fig. 2. In this figure the propeller is shown as having three blades, indicated at 16, 18, and 20, and is supported and driven by an engine 22. Within the shank or root portion of each blade there it a vane type hydraulic motor, one of which is shown in section in Fig. 2. This motor has a relatively fixed inner member 24 to which are secured a pair of diametrically opposed abutments 26 and 28 and the propeller blade has a pair of diametrically opposed vanes 30 and 32 which cooperate with the inner abutments to provide segmental shaped expansion chambers in the motor. Fluid under pressure is supplied by a pump 34, which may comprise an annular series of cylinders, as indicated at 36 and 38, carried by the propeller hub for rotation therewith and each including a piston, as indicated at 40 and 42, respectively, which pistons have portions contacting a fixed cam 44 which is eccentric to the axis of rotation of the propeller so that the pump pistons will be reciprocated in their cylinders as they are rotated with the propeller about the cam. An annular sump 46 is carried by the pump casing and connected with the intake of the pump cylinders and a pressure fluid manifold 48 is also carried by the pump casing and connected with the outlet of the pump cylinders. The usual relief valve 49 is provided between the pump inlet and outlet.

A distributing valve 50 is carried by the propeller and hydraulically interposed between the pump 34 and the vane motors of the propeller. The pressure manifold 48 of the pump is connected with this valve at port 52, while the sump 46 is connected with the valve through the drain connections 54 and 56. The opposite sides of the pitch changing motors are connected with the valve through channels 58 and 60 and the valve contains a plunger 62 provided with pistons 64 and 66 which control the connections between port 52 and channels 58 and 60 and also between the channels and the drain connections 54 and 56 in a manner to supply fluid under pressure to one side or the other of the motor while connecting the opposite side with drain, in response to a movement of plunger 62 in one direction, and to reverse these connections upon a movement of plunger 62 in the opposite direction. The valve cylinder is in the form of a sleeve 68 surrounding plunger 62 and slidable in valve body 50 by mechanism comprising cam 70 on the motor, lever 72 mounted on a fulcrum 74 and having one end in contact with cam 70, the other end of the lever being pivotally connected to sleeve 68. A compression spring 76 maintains the free end of the lever in contact with cam 70. This follow-up mechanism acts to maintain the propeller pitch at an angle corresponding to the particular position of plunger 62. The free end of plunger 62 has a head 63 in an annulus in disc 78 which is movable axially by a spiral spline 80 integral with the external gear 82, which is rotatable by rack 84. When rack 84 is moved lengthwise it rotates gear 82 within fixed cylinder 88 which supports cam 44. Spline 80 spirally engages cylinder 88 and is integral with gear 82, therefore, rotation of gear 82 causes disc 78 to move lengthwise thereby imparting longitudinal movement to plunger 62.

Rack 84 is connected with rack 94 of the other propeller by a pair of axially aligned links, in the form of rods 96 and 98, which are inter-connected by a manually operable adjusting mechanism generally indicated at 100. Rack 84 is movable by a servo-motor 90 (Fig. 1) controlled in known manner by a speed governor generally indicated at 92.

Motor 90 includes a piston 102 connected with rack 84 and rod 96 and reciprocable in cylinder 104. Fluid under pressure is supplied between the piston and the cylinder head 106 through a channel leading from the governor 92 and including the port 107. This governor controlled supply of fluid under pressure serves to move the piston 102 in one direction. The piston is moved in the opposite direction by compression springs 108 enclosed in a casing 110 and bearing at one end against a fixed abutment 112 and at the other end against a movable abutment 114 connected with rod 98 and rack 94. The hydraulic portion of the servo-motor and the spring portion thereof being connected respectively with racks 84 and 94 serve to maintain rods 96 and 98 in tension, and the rods may, therefore, be relatively light in weight.

The manual adjustment 100 comprises a tubular member 116 into which the adjacent ends of rods 96 and 98 extend and in which they are held against rotation by slidable keys. This tubular member is supported by integral arms 118 slidably mounted on a pin 120 in bracket 122 secured to a relatively fixed part of the airplane, preferably midway between the propellers. Rods 96 and 98 are axially adjustable and held in adjusted position by sheaves 124 and 126, set snugly into slots in member 116 and threaded onto the ends of the rods. Either or both of the sheaves may be rotated manually by cables 128, 130.

Rotation of the sheaves about the screw threads on the rods will cause the rods to move axially into or out of the sheaves and will thus move one or both of the racks 84 and 94, depending upon the condition of the hydraulic portion of the servo-motor 90. Normally, rack 84 will be positioned entirely by the servo-motor and only rack 94 will be moved by adjustment of the sheaves. The normal use of the manual adjustment 100 is to change the pitch of one of the propellers a slight amount to compensate for changes or irregularities in the inter-connecting mechanism such as might be caused by temperature changes or other conditions or to equalize or control propeller operating characteristics such as thrust or speed. The main speed adjustment of the power plant is the speed setting adjustment of the governor 92 which may include a governor carried sheave 132 manually rotatable by cable 134 leading over idler sheaves 136 to a location convenient for the pilot.

In the construction of Fig. 4, in which the propellers are geared together, a change in the governor setting by movement of sheave 132 or a change in the throttle opening of either or both engines, which will cause a change in speed sufficient to operate the governor to restore the speed, will cause a simultaneous and equal change in the pitch of both propellers to maintain the speed of both propellers at the speed determined by the governor setting. Both propellers will operate at the same speed because they are geared together. A change in the pitch of the blades of one propeller without a corresponding change in the pitch of the blades of the other propeller by movement of sheave 124 or 126 will cause the governor to act if the propeller speed is affected to compensate for any change in the speed of the propellers, which are maintained at the same speed by the gears connecting them, and are maintained at a constant speed by the governor which is driven in timed relations with the propellers. Hence, both propellers will continue to run at the speed determined by the governor setting but one propeller will absorb more power than the other and thus increase or decrease the thrust of one propeller with respect to that of the other without affecting the total power delivered to both propellers which will remain unchanged. The propellers will then act in a manner similar to a rudder and cause the airplane to turn.

In the construction shown in Fig. 3, in which the engines and propeller are separate units, assuming both engines A and B to be running at the same speed, a change in the governor setting by movement of sheave 132 will cause a simultaneous and equal change of the pitch of both propellers to maintain the speed of both propellers substantially the same as the speed determined by the governor setting. An independent change of the throttle opening of either engine or an independent change of the pitch of either propeller will cause a change in the relative speeds of the engines.

There has thus been illustrated and described a suitable control for two or more jointly operating engines, utilizing a single governor and a single governor-controlled servo-motor connected by linkage with two propellers and in which a manual device is provided for adjusting the linkage inter-connecting the two propellers for temperature change, expansion and contraction, and also to provide a manual control of one or both of the propellers if desired.

It is to be understood that the invention is not limited to the specific embodiment herein illustrated and described, but may be used in other ways without departure from its spirit as defined by the following claims.

I claim:

1. In an aircraft powerplant including at least two engines and an adjustable pitch propeller driven by each engine, means for substantially synchronizing the speeds of said engines, said synchronizing means including pitch-adjusting means for each propeller, in combination with a governor driven by one of said engines, and servo mechanism operatively connecting said governor with each of said pitch-adjusting means, said servo mechanism including manually adjustable means for providing limited speed variations between said engines while both propellers are under control of said governor.

2. The invention set forth in claim 1 in which said servo device is hydraulically operated.

3. In a powerplant including at least two engines in spaced-apart relation on an aircraft, each engine driving a controllable-pitch propeller, speed regulating means for said engines, comprising in combination, a pitch changing mechanism for each propeller, each pitch changing mechanism including an axially movable rack, linkage interconnecting said racks, a governor driven by one of said engines, a single acting hydraulic motor actuated by said governor and operatively connected with one of said racks to urge it in a direction away from the other of said racks, and a compression spring operatively associated with said other rack to resiliently urge said other rack away from said first rack, thereby maintaining said linkage under tension.

4. The arrangement set forth in claim 3 including manually operable means for varying the length of said linkage.

5. Control apparatus for an aircraft powerplant comprising at least two engines each engine driving its own separate controllable-pitch propeller, in combination with a speed responsive governor for directly controlling the pitch of one of said propellers and having a connection with the other propeller for simultaneously controlling the pitch of said other propeller, and means for manually controlling the pitch of said other propeller with respect to said one propeller while both propellers are under control of said governor.

6. In an airplane, two spaced-apart engine-driven controllable-pitch propellers each having pitch changing mechanism, a speed governor driven in timed relation with one of said propellers and governing the speed of said one propeller by controlling the pitch thereof, means for extending the control of said governor to the other propeller and changing the pitch of the other propeller simultaneously with, and substantially the same amount as, the pitch change in said one propeller including linkage interconnecting the pitch changing mechanism of said two propellers, a servomotor operatively connected with said governor and said linkage adjacent one end of said linkage for operating the pitch changing mechanism of said one propeller and moving said linkage in one direction, a spring adjacent the pitch changing mechanism of said other propeller and operating on said linkage adjacent the other end of said linkage for moving said linkage in the other direction and maintaining said linkage continuously biased in one direction, means associated with the pitch changing mechanism of said other propeller for translating movements of said linkage into pitch changing movements of said other propeller and means for changing the pitch of said other propeller with respect to the pitch of said one propeller while maintaining governor control of both propellers comprising means forming a portion of said linkage between said servomotor and said spring for altering the length of said linkage.

7. Control means for two engine-driven controllable-pitch propellers, comprising in combination, pitch varying mechanism for each propeller, means, including linkage, interconnecting the pitch varying mechanism of said propellers, a governor driven in timed relation with one of said propellers, an hydraulic cylinder servo device arranged at one end of said linkage and interconnecting said governor and said mechanism of said one propeller, and a spring at the other end of said linkage maintaining said linkage under tension.

8. In combination with two controllable-pitch propellers each having hydraulically actuated pitch changing mechanism, a two-part valve in each propeller one part of which is positioned by the propeller blades and movable by the pitch changing movements of said blades, the position of the second part of said valve determining the propeller pitch, a governor driven in timed relation with one propeller and controlling the position of the second part of the valve associated with said one propeller for maintaining the speed of said one propeller at a predetermined value by controlling the pitch thereof, means connecting the second valve part of one propeller with the second valve part of the other propeller for causing substantially simultaneous and equal pitch changes in the two propellers and means for varying the pitch of one propeller with respect to the other propeller.

9. In combination with two controllable-pitch propellers each having hydraulically actuated pitch changing mechanism, a two-part valve in each propeller one part of each valve being positioned by the propeller blades of its respective propeller and movable by the pitch changing movements of said blades, the position of the second part of each valve determining the pitch of its respective propeller, a governor driven in timed relation with one propeller and controlling the position of the second part of the valve associated with said one propeller for maintaining the speed of said one propeller at a predetermined value by controlling the pitch thereof, means connecting the second valve part of said one propeller with the second valve part of the other propeller for causing substantially simultaneous and equal pitch changes in the two propellers, and means for varying the pitch of one propeller with respect to the other propeller including means for adjusting the connection between the second valve parts of the two propellers while both propellers are rotating.

10. In an aircraft, two spaced-apart engine-driven controllable pitch propellers operatively connected together for simultaneous rotation, means for changing the pitch of each propeller, a speed governor driven in timed relation with one of said propellers and controlling the pitch thereof, means for extending the control of said governor to the other propeller and changing the pitch of the other propeller simultaneously with, and substantially the same amount as, the pitch change in said one propeller, including linkage interconnecting the pitch changing mechanism of said two propellers, a servo-motor operatively connected with said governor and said linkage adjacent one end of said linkage for operating the pitch changing mechanism of said one propeller and moving said linkage in one direction, a spring adjacent to the pitch changing mechanism of said other propeller and operating on said linkage adjacent the other end of said linkage for moving said linkage in the other direction and maintaining said linkage under tension, means forming a portion of said linkage associated with the pitch changing mechanism of said other propeller for translating movement of said linkage into pitch changing movements of said other propeller and means for changing the pitch of said other propeller with respect to the pitch of said one propeller while maintaining governor control of both propellers comprising means between said servo-motor and said spring for altering the length of said linkage.

11. In a power plant including at least two engine-driven controllable-pitch propellers in spaced-apart relation on an aircraft, and operatively connected together for simultaneous rotation, speed regulating means for said propellers comprising in combination, a pitch changing mechanism including an axially movable rack, for each propeller, linkage interconnecting said racks, a governor driven in timed relation with one of said propellers, a single acting hydraulic motor actuated by said governor and operatively connected with one of said racks to urge it in a direction away from the other of said racks, and a spring operatively associated with said other rack to resiliently urge said other rack away from the said first rack, thereby maintaining said linkage under tension.

12. The arrangement set forth in claim 11 including manually operable means for varying the length of said linkage.

13. Speed regulating means for at least two engines on an aircraft, each engine driving a respective variable pitch propeller having pitch varying mechanism effective for controlling the load on the engine to which it is connected and having separate sources of power for operating the respective pitch varying mechanism, comprising in combination, means interconnecting a portion of the pitch varying mechanism of one of said propellers and a similar portion of the pitch varying mechanism of the other of said propellers for simultaneously actuating both of said pitch varying mechanisms, a governor driven by one of said mechanisms and a servo device interconnecting said governor and said portion of one of said mechanisms, said interconnecting means including linkage and means for maintaining said linkage under tension, said servo device being operable by a hydraulic cylinder at one end of said linkage, said means for maintaining said linkage under tension comprising a spring at the other end of said linkage.

14. Speed regulating means for at least two engines on an aircraft, comprising in combination, a variable pitch propeller driven by each engine, and effective for controlling the load on the engine to which it is connected, separate pitch varying mechanism for each propeller, means including linkage interconnecting the pitch varying mechanisms of said propellers, a governor driven by one of said engines and a servo-device including a hydraulic cylinder at one end of said linkage interconnecting said governor and said mechanism and a spring at the other end of said linkage for maintaining said linkage under tension.

ERLE MARTIN.

REFERENCES CITED

The following references are of record in the file of this patent:

UNITED STATES PATENTS

| Number | Name | Date |
| --- | --- | --- |
| 754,038 | Ball et al. | Mar. 8, 1904 |
| 1,421,803 | Martin | July 4, 1922 |
| 2,023,785 | Hoover | Dec. 10, 1935 |
| 2,112,965 | Koster | Apr. 5, 1938 |
| 2,123,057 | Martin | July 5, 1938 |
| 2,125,474 | Wachs | Aug. 2, 1938 |
| 2,205,625 | Mader | June 25, 1940 |
| 2,224,177 | Algarsson | Dec. 10, 1940 |
| 2,229,058 | Dicks | Jan. 21, 1941 |
| 2,236,841 | Waseige | Apr. 1, 1941 |
| 2,250,695 | Algarsson | July 29, 1941 |
| 2,257,126 | Rindfleisch | Sept. 30, 1941 |
| 2,280,654 | Mader | Apr. 21, 1942 |
| 2,284,473 | Menasco et al. | May 26, 1942 |
| 2,302,042 | Martin | Nov. 17, 1942 |
| 2,312,624 | Caldwell | Mar. 2, 1943 |
| 2,319,218 | Drake | May 18, 1943 |
| 2,324,625 | Hoover | July 20, 1943 |
| 2,325,632 | Pullin | Aug. 3, 1943 |
| 2,354,422 | Roby | July 25, 1944 |
| 2,362,444 | Blanchard et al. | Nov. 14, 1944 |
| 2,370,149 | Couch | Feb. 27, 1945 |
| 2,380,889 | Waseige | July 31, 1945 |
| 2,414,766 | Platt | Jan. 21, 1947 |

FOREIGN PATENTS

| Number | Country | Date |
| --- | --- | --- |
| 134,258 | Great Britain | Oct. 30, 1919 |
| 503,154 | Great Britain | Apr. 3, 1939 |